(12) United States Patent
Lee et al.

(10) Patent No.: US 8,986,889 B2
(45) Date of Patent: Mar. 24, 2015

(54) POSITIVE ACTIVE MATERIAL FOR LITHIUM SECONDARY BATTERY AND METHOD OF MANUFACTURING SAME

(75) Inventors: Joon-Hyung Lee, Yongin-si (KR); Andriy Kvasha, Yongin-si (KR); Oleg Levin, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 59 days.

(21) Appl. No.: 13/297,776

(22) Filed: Nov. 16, 2011

(65) Prior Publication Data

US 2012/0107691 A1     May 3, 2012

Related U.S. Application Data

(63) Continuation of application No. 13/284,777, filed on Oct. 28, 2011.

(30) Foreign Application Priority Data

Nov. 2, 2010    (KR) .................. 10-2010-0108353

(51) Int. Cl.
*H01M 4/525*     (2010.01)
*H01M 4/13*      (2010.01)
(Continued)

(52) U.S. Cl.
CPC ............ *H01M 4/5825* (2013.01); *H01M 4/131* (2013.01); *H01M 4/364* (2013.01); *H01M 4/366* (2013.01); *H01M 4/624* (2013.01); *H01M 4/525* (2013.01); *H01M 10/052* (2013.01); *Y02E 60/122* (2013.01)
USPC ................. 429/231.95; 252/182.1; 429/231.5

(58) Field of Classification Search
CPC ........................... H01M 4/366; H01M 4/5825

USPC ...................... 429/218.1, 231.9, 231.95, 232; 29/623.1–623.5
See application file for complete search history.

(56) References Cited

U.S. PATENT DOCUMENTS

2007/0259271 A1    11/2007   Nanno et al.
2008/0124630 A1*   5/2008    Kim et al. ...................... 429/213
(Continued)

FOREIGN PATENT DOCUMENTS

| | | |
|---|---|---|
| CN | 1938895 A | 3/2007 |
| JP | 02-162605 A | 6/1990 |

(Continued)

OTHER PUBLICATIONS

Kotobuki et al.,"All-solid-state lithium battery with a three-dimensionally ordered Li1.5Al0.5 Ti1.5(PO4)3 electrode", Electrochimica Acta, Elsevier Science Publishers, Barking, GB, vol. 55, No. 22, Sep. 1, 2010, pp. 6892-6896.

(Continued)

*Primary Examiner* — Barbara Gilliam
*Assistant Examiner* — Stephan Essex
(74) *Attorney, Agent, or Firm* — Knobbe, Martens, Olson & Bear LLP

(57) ABSTRACT

A positive active material for a lithium secondary battery comprises a core comprising a compound that can reversibly intercalate and deintercalate lithium; and a compound attached to the surface of the core and represented by Chemical Formula 1:

$$Li_{1+x}M(I)_xM(II)_{2-x}Si_yP_{3-y}O_{12},\quad\text{[Chemical Formula 1]}$$

wherein M(I) and M(II) are selected from the group consisting of Al, Zr, Hf, Ti, Ge, Sn, Cr, Nb, Ga, Fe, Sc, In, Y, La, Lu, and Mg, and $0<x\le0.7$, $0\le y\le1$.

7 Claims, 19 Drawing Sheets

(51) Int. Cl.
*H01M 4/58* (2010.01)
*H01M 4/131* (2010.01)
*H01M 4/36* (2006.01)
*H01M 4/62* (2006.01)
*H01M 10/052* (2010.01)

(56) References Cited

U.S. PATENT DOCUMENTS

| | | |
|---|---|---|
| 2008/0241698 A1 | 10/2008 | Katoh |
| 2008/0311479 A1 | 12/2008 | Lee et al. |
| 2008/0318124 A1* | 12/2008 | Horiuchi et al. ............ 429/199 |
| 2009/0068563 A1 | 3/2009 | Kanda et al. |
| 2009/0305141 A1 | 12/2009 | Lee et al. |
| 2010/0310940 A1 | 12/2010 | Kim et al. |

FOREIGN PATENT DOCUMENTS

| | | |
|---|---|---|
| JP | 02-225310 A | 9/1990 |
| JP | 08-153513 A | 6/1996 |
| JP | 2008-226463 A | 9/2008 |
| KR | 10-2006-0054709 A | 5/2006 |
| KR | 10-2007-0060023 A | 6/2007 |
| KR | 10-2007-0092621 A | 9/2007 |
| KR | 10-0814881 B1 | 12/2008 |
| KR | 10-2009-0027144 A | 3/2009 |
| KR | 10-2010-0004025 A | 1/2010 |
| KR | 10-2010-0052116 A | 5/2010 |
| WO | 2005/083829 A2 | 9/2005 |
| WO | 2006/064774 A1 | 6/2006 |

OTHER PUBLICATIONS

Xianming Wu et al., "Synthesis and characterization of Li1.3Al0.3Til.7(PO4)3-coated LiMn2O4 by wet chemical route", Rare Metals—Xiyou Jinshu, Press of Metallurgical Industry, Beijing, CN, vol. 28, No. 2, Apr. 1, 2009, pp. 122-126.

Hideyuki Morimoto et al.,"Preparation of High Lithium Ion Conductive Glass-Ceramics Solid Electrolytes in the LiTi2(PO4) 3 System by the Mechanochemical Method and their Application as Coating Materials of LiCoO2", Key Engineering Materials, Trans Tech Publications Ltd., Stafa-Zurich, CH, vol. 388, Jan. 1, 2009, pp. 77-80.

Xiaoxiong Xu, et al.,"Lithium ion conductive glass ceramics in the system Li1.4Al0.4(Gel-xTix)1.6(PO4)3 (x=0-1.0)", Solid State Ionics, North Holland Pub. Company. Amsterdam; NL, NL, vol. 171, No. 3-4, Jul. 30, 2004, pp. 207-213.

Office Action dated Feb. 20, 2012 of corresponding Korean Patent Application 10-2010-0108353—6 pages.

European Search Report dated Feb. 21, 2012 of corresponding European Patent Application No. 11187375.8 —9 pages.

Korean Office Action dated Nov. 28, 2012 of corresponding Korean Patent Application No. 10-2010-0108353—4 pages.

Notice of Allowance dated Mar. 29, 2013 of corresponding Korean Patent Application No. 10-2010-0108353—5 pages.

European Office Action dated Sep. 12, 2013 of corresponding European Patent Application No. 11187375.8—5 pages.

Chinese Office Action dated Jul. 15, 2014 of corresponding Chinese Patent Application No. 201110340854.0 and its English translation—12 pages.

Chinese Office Action dated Nov. 22, 2013 of corresponding Chinese Patent Application No. 201110340854.0—14 pages.

* cited by examiner

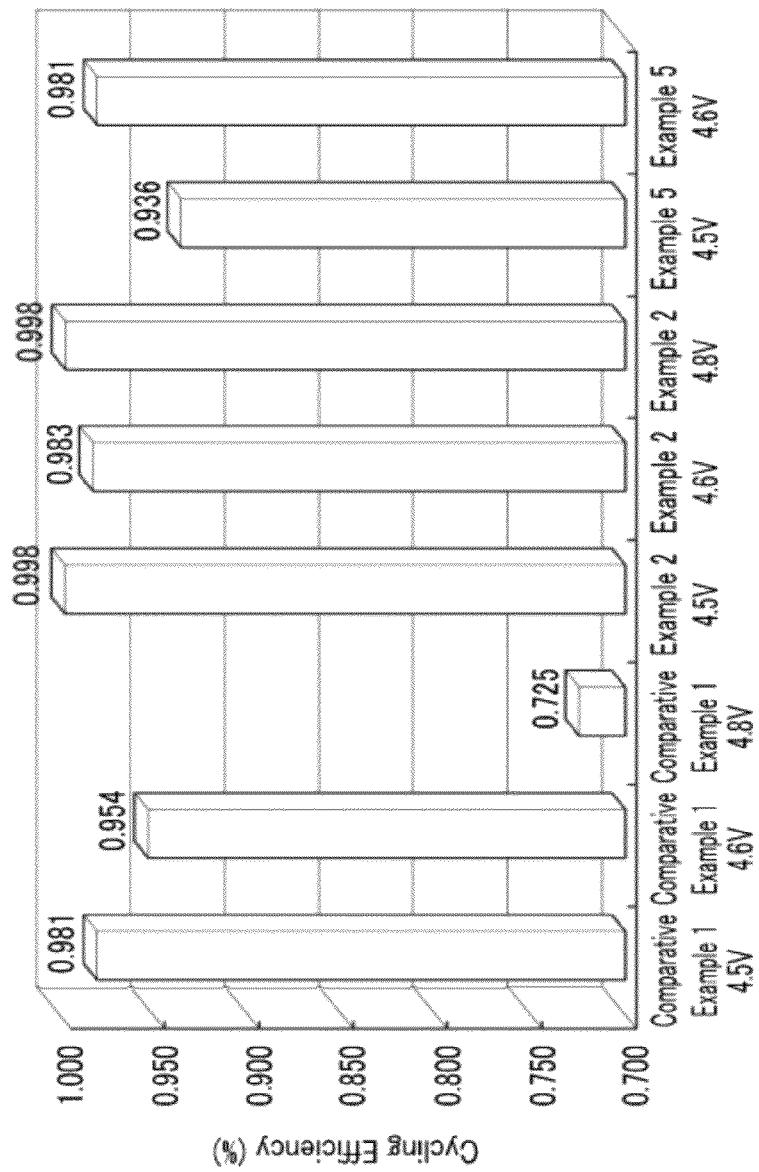

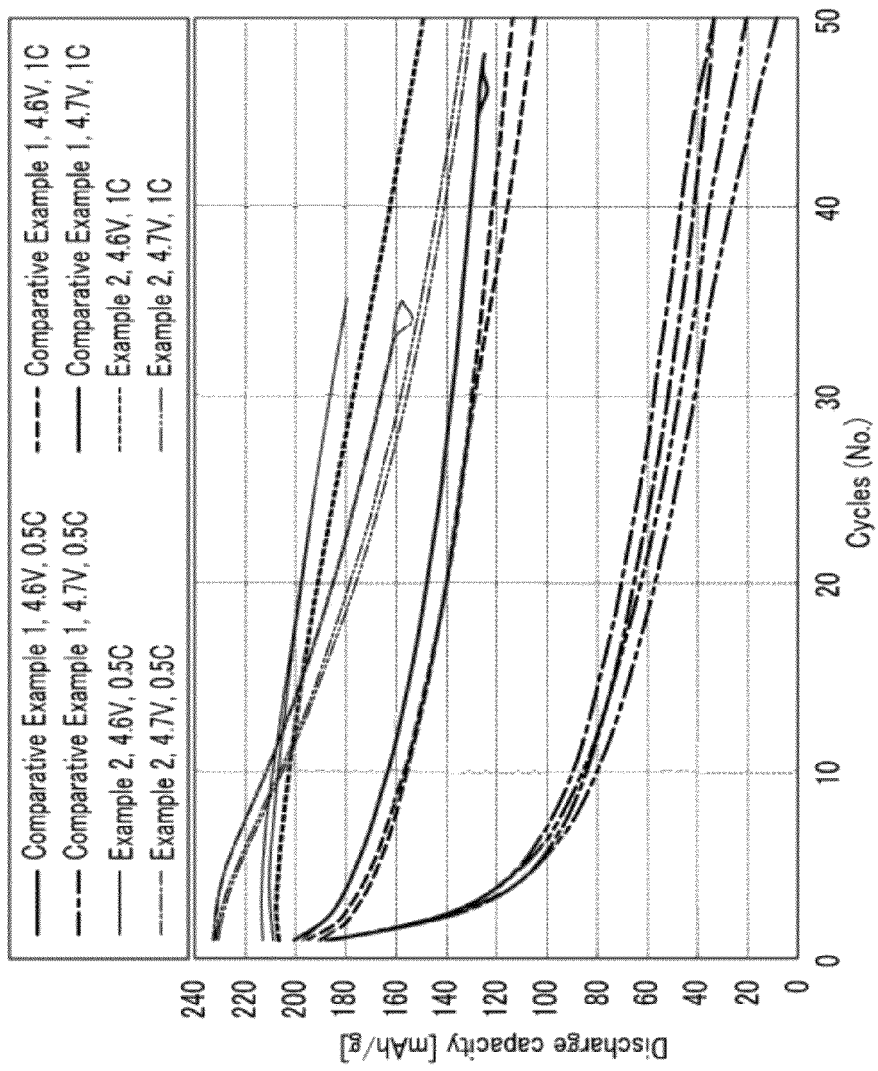

FIG.10A
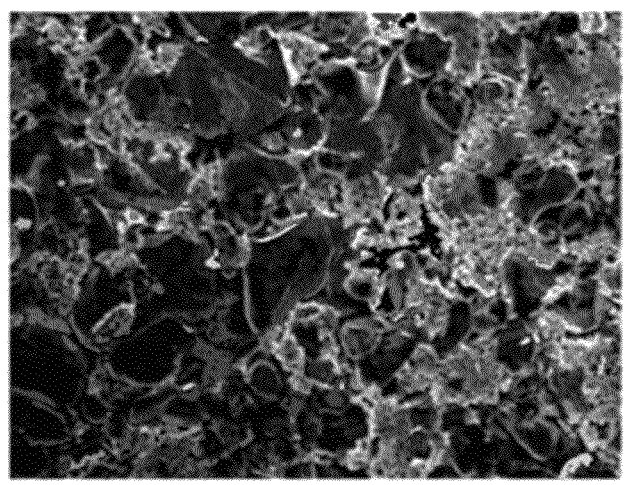
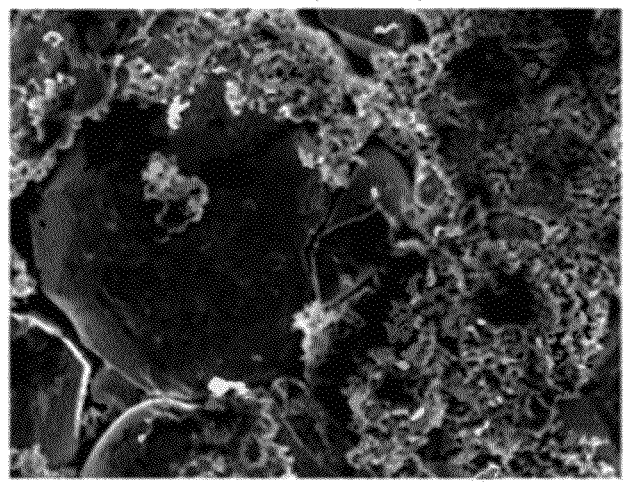

FIG.10B
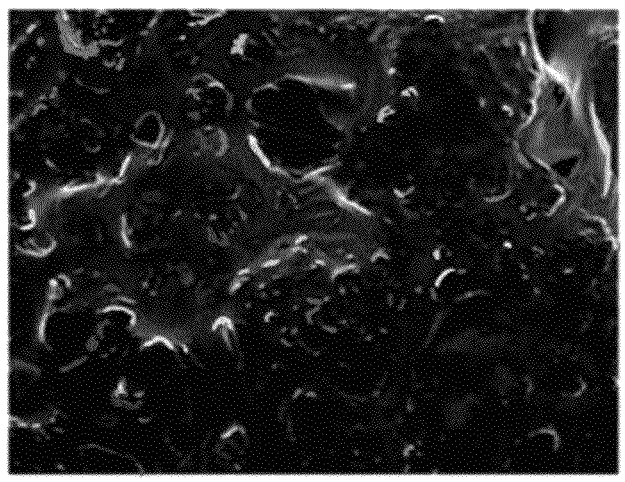
s174 SEI 5.0kV x1,000 10μm WD 8mm
(1C, 4.7V)
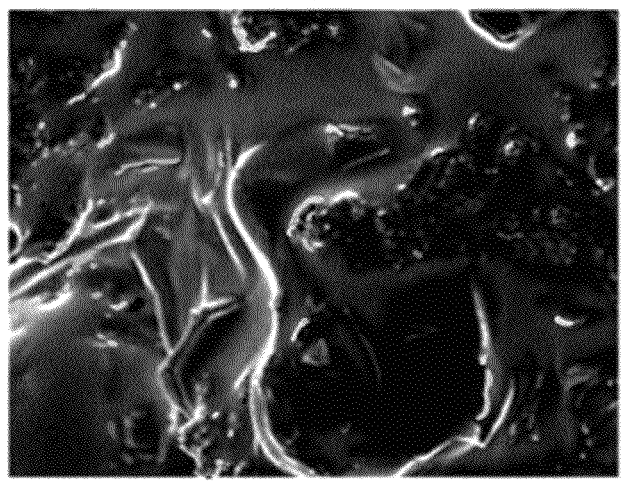
s174 SEI 5.0kV x3,000 1μm WD 8mm FIG.10C
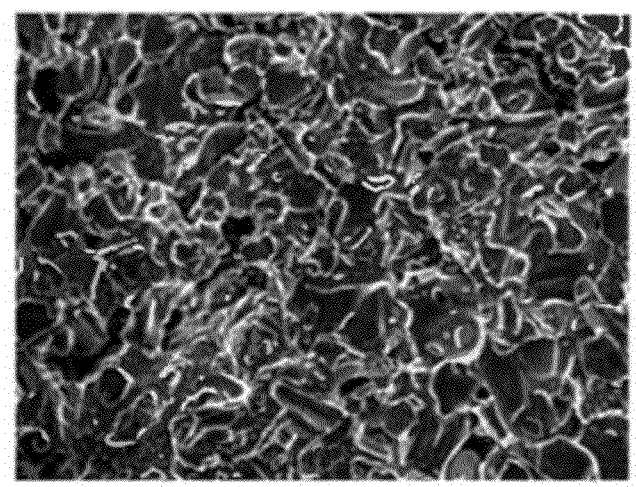
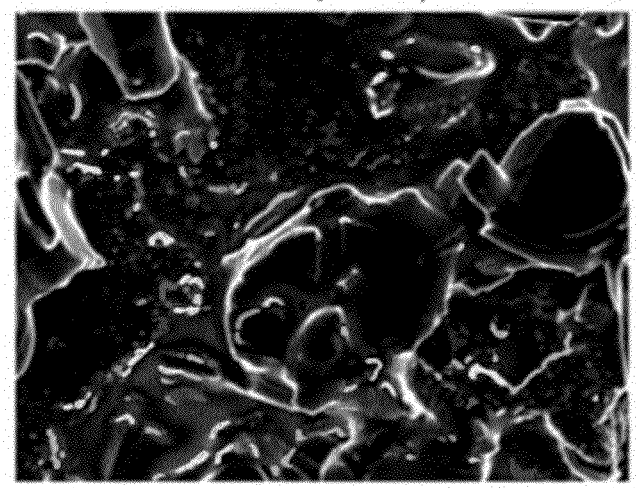

FIG.11A
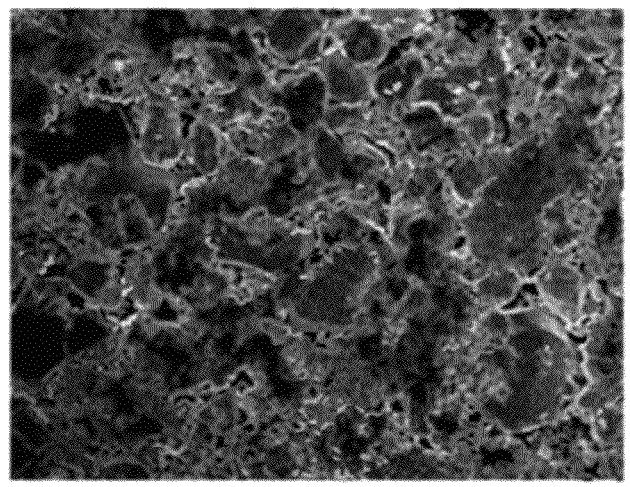
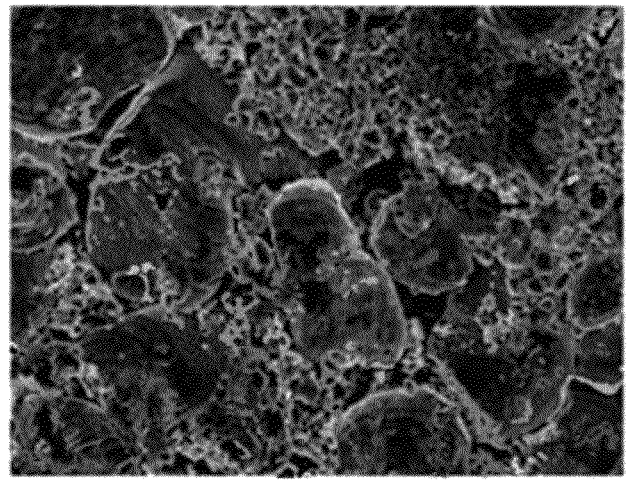

FIG.11B
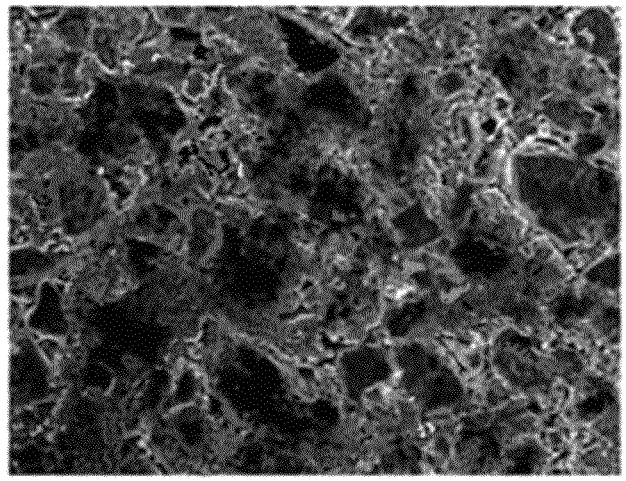
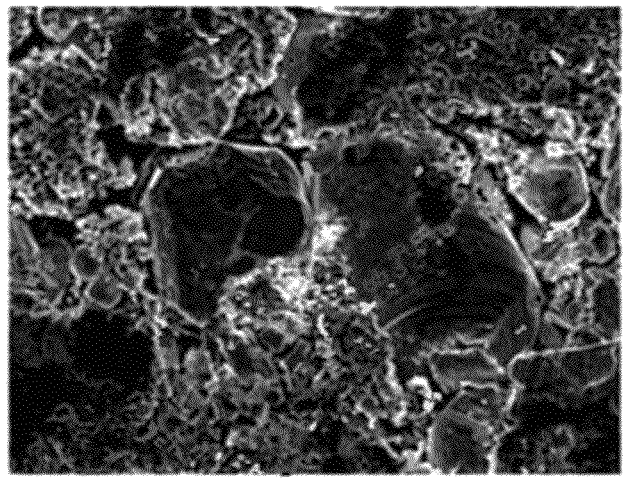

FIG.11C
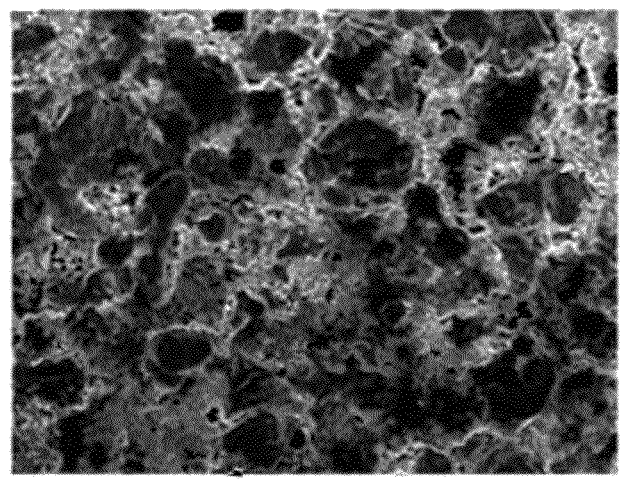
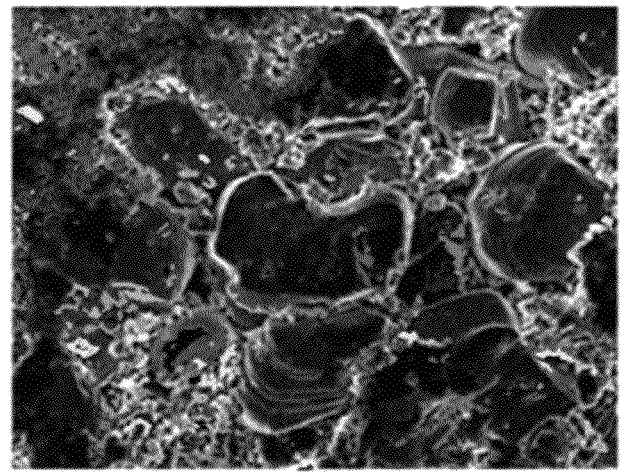

POSITIVE ACTIVE MATERIAL FOR LITHIUM SECONDARY BATTERY AND METHOD OF MANUFACTURING SAME

RELATED APPLICATIONS

This is a continuation application claiming the benefit of earlier filing date of application Ser. No. 13/284,777, filed Oct. 28, 2011, which claims priority to and the benefit of Korean Patent Application No. 10-2010-0108353 filed in the Korean Intellectual Property Office on Nov. 2, 2010, the entire contents of which are incorporated herein by reference.

BACKGROUND

1. Field

Provided are a positive active material for a lithium secondary battery and a method of manufacturing the same.

2. Description of the Related Technology

Electronic equipment has recently become down-sized and lighter as portable electronic devices have become more widely used. Accordingly, research is conducted on lithium secondary batteries with high energy density as power sources for portable electronic devices.

A lithium secondary battery typically includes materials that reversibly intercalate or deintercalate lithium ions as negative and positive electrodes and also includes an organic electrolyte or a polymer electrolyte through which lithium ions move between the positive and negative electrodes. Electrical energy is produced through oxidation/reduction when lithium ions are intercalated/deintercalated at the positive and negative electrodes.

A lithium metal has been typically used as the negative active material for such a lithium secondary battery. However, since the lithium metal can cause battery short-circuiting due to dendrites during charging and discharging, a lithium secondary battery may explode. In order to solve this problem, a carbon-based material that can reversibly accept or supply lithium ions, while maintain structural and electrical characteristic, and that has a similar half-cell potential to a lithium metal during the intercalation and deintercalation of lithium ions is widely used as a negative active material.

On the other hand, a positive active material for a lithium secondary battery may include the chalcogenide compound of a metal that can intercalate/deintercalate lithium ions and practically, a composite metal oxide such as $LiCoO_2$, $LiMn_2O_4$, $LiNiO_2$, $LiNi_{1-x}Co_xO_2$ (0<x<1), $LiMnO_2$, and the like. Among these positive active materials, $LiNiO_2$ has a large charge capacity but is hard to synthesize and has poor cycleability. Mn-based active materials such as $LiMn_2O_4$, $LiMnO_2$, and the like are easy to synthesize and environment-friendly as well as cost relatively low but has small capacity. In addition, since $LiCoO_2$ has electric conductivity ranging from $10^{-2}$ to 1 S/cm at room temperatures, high operating battery voltage, and excellent electrode characteristic, it is widely used. However, $LiCoO_2$ has the problem of low stability during the high rate charge and discharge and cannot be efficiently operated at high temperature and voltages over 4.3V.

In general, these composite metal oxides are prepared by mixing raw solid powders and firing the mixture in a solid-phase reaction method. For example, Japanese Patent Notification Hei 8-153513 discloses a method of preparing $LiNi_{1-x}Co_xO_2$ (0<x<1) by mixing $Ni(OH)_2$ with $Co(OH)_2$ or hydroxides including Ni and Co, heat-treating the mixture, and pulverizing. Otherwise, a complete crystalline active material may be prepared by reacting LiOH, an Ni oxide, and a Co oxide, primarily heat-treating the mixture at 400 to 580° C. to form an initial oxide, and secondarily heat-treating the initial oxide at 600 to 780° C.

When an active material prepared according to the above method is applied to a lithium secondary battery, it may have a side reaction with an electrolyte and thus, may not maintain the main characteristics of the lithium secondary battery at high voltages.

SUMMARY

An embodiment of the present invention provides a positive active material which can maintain main characteristics of a rechargeable battery even at a high voltage.

Another embodiment of the present invention provides a lithium secondary battery including the positive active material.

According to one embodiment of the present invention, a positive active material for a lithium secondary battery is provided that includes a core including a compound that can reversibly intercalate/deintercalate lithium; and a compound attached to the surface of the core and represented by the following Chemical Formula 1.

$$Li_{1+x}M(I)_xM(II)_{2-x}Si_yP_{3-y}O_{12}$$ [Chemical Formula 1]

In Chemical Formula 1, M(I) and M(II) are selected from the group consisting of Al, Zr, Hf, Ti, Ge, Sn, Cr, Nb, Ga, Fe, Sc, In, Y, La, Lu, and Mg, and 0<x≤0.7, 0≤y≤1.

In Chemical Formula 1, M(I) may be Al and M(II) may be Ti.

The compound represented by Chemical Formula 1 may be attached to the core as discrete particles and/or a layer.

The positive active material for a lithium secondary battery may include the core in an amount ranging from about 96 wt % to about 98.5 wt % and the compound represented by the above Chemical Formula 1 in an amount ranging from about 1.5 wt % to about 4 wt %.

The core may be at least one composite oxide including a metal selected from cobalt, manganese, nickel, and a combination thereof, and lithium.

According to another embodiment of the present invention, a positive electrode including the positive active material, a conductive material, and a binder is provided.

According to another embodiment of the present invention, a lithium secondary battery including the aforementioned positive electrode is provided.

According to another embodiment of the present invention, a method of manufacturing a positive active material for a lithium secondary battery is provided that includes (a) mixing a Li source, a M(I) source, a M(II) source, and a phosphate source to prepare a mixture; (b) preparing a compound represented by the following Chemical Formula 1 by heating the mixture in the process (a); (c) admixing a core including a compound that may reversibly intercalate and deintercalate lithium to the compound represented by the Chemical Formula 1 in the process (b) to prepare a mixed product; and (d) heating the mixed product.

$$Li_{1+x}M(I)_xM(II)_{2-x}Si_yP_{3-y}O_{12}$$ [Chemical Formula 1]

In Chemical Formula 1, M(I) and M(II) are selected from the group consisting of Al, Zr, Hf, Ti, Ge, Sn, Cr, Nb, Ga, Fe, Sc, In, Y, La, Lu, and Mg, and 0<x≤0.7, 0≤y≤1.

In Chemical Formula 1, M(I) may be Al and M(II) may be Ti.

The process (b) may include (b1) heating the mixture to form a compound represented by the above Chemical Formula 1 in a first heating step; (b2) pulverizing the resulting compound obtained in the process (b1); and (b3) heating to crystallize the compound pulverized in the process (b2) in a second heating step. Herein, first heating step may be performed at a lower temperature than the second heating step.

In the process (c), the core may comprise a composite oxide including a metal selected from cobalt, manganese, nickel, and a combination, and lithium.

According to further embodiment of the present invention, a positive electrode for a lithium secondary battery is provided that includes a positive active material prepared according to the aforementioned method, a conductive material, and a binder.

According to further embodiment of the present invention a lithium secondary battery including the aforementioned positive electrode is provided.

The positive active material is coated with a highly ion conductive ceramic compound on the surface and thus, does not directly contact an electrolyte and a side reaction under high temperature/high voltage conditions is suppressed. In addition, the positive active material has fast ion transferring reaction on the coated surface, improving the impedance and the efficiency of a battery.

BRIEF DESCRIPTION OF THE DRAWINGS

FIG. 4 shows CV efficiency data at the $1^{st}$ cycle.

FIGS. 8A and 8B show discharge capacity comparison data depending on cycle numbers at high charge cut-off voltage.

FIGS. 10A, 10B, and 10C provide SEM photographs of the surface of an electrode according to Comparative Example 1 at a high charge cut-off voltage.

FIGS. 11A, 11B, and 11C provide SEM photographs of the surface of an electrode according to Example 2 at a high charge cut-off voltage.

DETAILED DESCRIPTION

Figure 1:
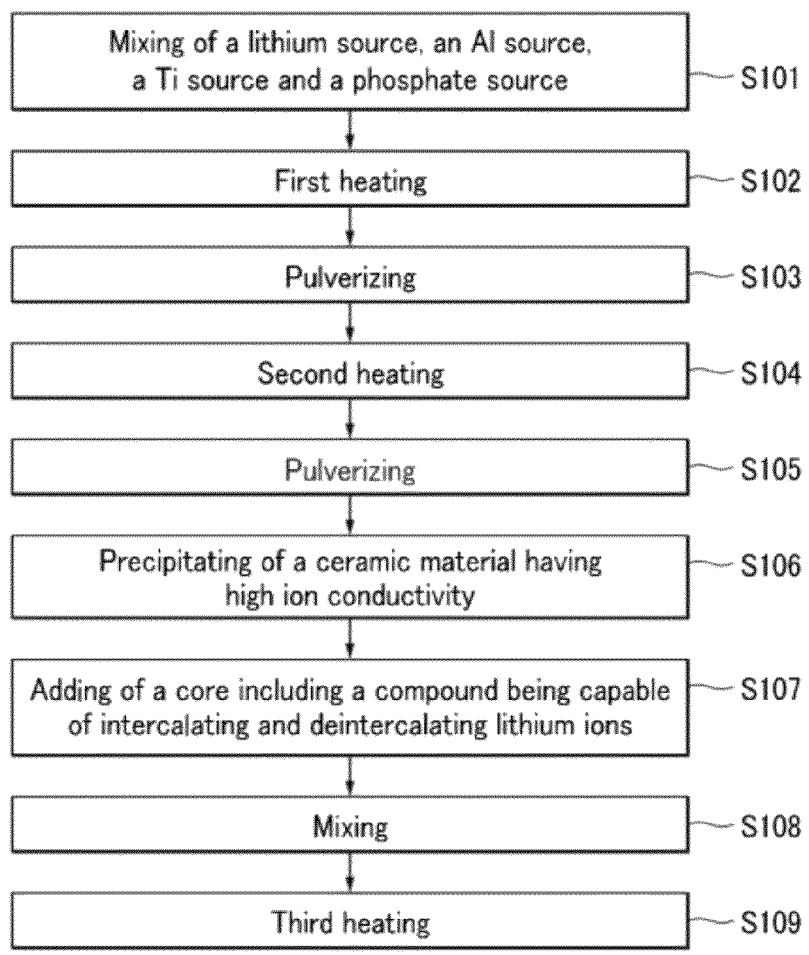
FIG. 1 is a flowchart showing a method of manufacturing a positive active material for a rechargeable battery according to one embodiment of the present invention.

This disclosure will be described more fully hereinafter with reference to the accompanying drawings, in which certain embodiments are shown. As those skilled in the art would realize, the described embodiments may be modified in various different ways, all without departing from the spirit or scope of this disclosure. Accordingly, the drawings and description are to be regarded as illustrative in nature and not restrictive.

According to one embodiment of the present invention, a positive active material for a lithium secondary battery may include a highly ion conductive ceramic compound to secure stability at a high voltage while not impairing characteristics of the lithium secondary battery.

Accordingly, a battery including a positive active material for a lithium secondary battery according to one embodiment of the present invention has no performance deterioration at a voltage of 4.3V or less and reinforced battery characteristic at a voltage of 4.3V or more, or about 4.3V to about 4.7V.

According to one embodiment of the present invention, a positive active material for a lithium secondary battery may include a core including a compound that may reversibly intercalate and deintercalate lithium ion, and a compound attached to the surface of the core as a highly ion conductive ceramic compound, represented by the following Chemical Formula 1:

$$Li_{1+x}M(I)_xM(II)_{2-x}Si_yP_{3-y}O_{12}$$ [Chemical Formula 1]

In Chemical Formula 1, M(I) and M(II) are selected from the group consisting of Al, Zr, Hf, Ti, Ge, Sn, Cr, Nb, Ga, Fe, Sc, In, Y, La, Lu, and Mg, and $0<x\le0.7$, $0\le y\le1$.

Non-limiting examples of a compound used for the core particle may include a common positive active material compound used for a positive electrode for a conventional electrochemical device, in particular, at least one composite oxide of a metal selected from cobalt, manganese, nickel, and a combination thereof, and lithium, and in more particular, one of the compounds listed by the following Chemical Formula 2.

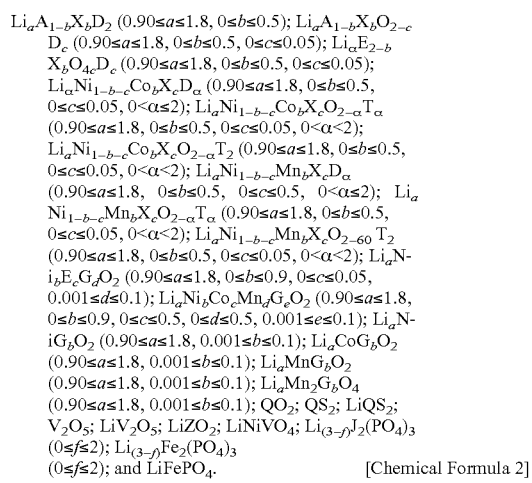
$$Li_aA_{1-b}X_bD_2 \ (0.90\le a\le1.8, 0\le b\le0.5); Li_aA_{1-b}X_bO_{2-c}D_c \ (0.90\le a\le1.8, 0\le b\le0.5, 0\le c\le0.05); Li_aE_{2-b}X_bO_{4c}D_c \ (0.90\le a\le1.8, 0\le b\le0.5, 0\le c\le0.05);$$
$$Li_aNi_{1-b-c}Co_bX_cD_\alpha \ (0.90\le a\le1.8, 0\le b\le0.5, 0\le c\le0.05, 0<\alpha\le2); Li_aNi_{1-b-c}Co_bX_cO_{2-\alpha}T_\alpha$$
$$(0.90\le a\le1.8, 0\le b\le0.5, 0\le c\le0.05, 0<\alpha<2);$$
$$Li_aNi_{1-b-c}Co_bX_cO_{2-\alpha}T_2 \ (0.90\le a\le1.8, 0\le b\le0.5, 0\le c\le0.05, 0<\alpha<2); Li_aNi_{1-b-c}Mn_bX_cD_\alpha$$
$$(0.90\le a\le1.8, \ 0\le b\le0.5, \ 0\le c\le0.5, \ 0<\alpha\le2); \ Li_aNi_{1-b-c}Mn_bX_cO_{2-\alpha}T_\alpha \ (0.90\le a\le1.8, 0\le b\le0.5, 0\le c\le0.05, 0<\alpha<2); Li_aNi_{1-b-c}Mn_bX_cO_{2-60}T_2$$
$$(0.90\le a\le1.8, 0\le b\le0.5, 0\le c\le0.05, 0<\alpha<2); Li_aN-i_bE_cG_dO_2 \ (0.90\le a\le1.8, 0\le b\le0.9, 0\le c\le0.05, 0.001\le d\le0.1); Li_aNi_bCo_cMn_dG_eO_2 \ (0.90\le a\le1.8, 0\le b\le0.9, 0\le c\le0.5, 0\le d\le0.5, 0.001\le e\le0.1); Li_aN-iG_bO_2 \ (0.90\le a\le1.8, 0.001\le b\le0.1); Li_aCoG_bO_2$$
$$(0.90\le a\le1.8, 0.001\le b\le0.1); Li_aMnG_bO_2$$
$$(0.90\le a\le1.8, 0.001\le b\le0.1); Li_aMn_2G_bO_4$$
$$(0.90\le a\le1.8, 0.001\le b\le0.1); QO_2; QS_2; LiQS_2;$$
$$V_2O_5; LiV_2O_5; LiZO_2; LiNiVO_4; Li_{(3-f)}J_2(PO_4)_3$$
$$(0\le f\le2); Li_{(3-f)}Fe_2(PO_4)_3$$
$$(0\le f\le2); \text{ and } LiFePO_4. \qquad \text{[Chemical Formula 2]}$$

In Chemical Formula 2, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The highly ion conductive ceramic compound (e.g., $Li_{1+x}M(I)_xM(II)_{2-x}Si_yP_{3-y}O_{12}$,) represented by Chemical Formula 1 has excellent lithium conductivity and electronic conductivity is negligible.

In Chemical Formula 1, M(I) and M(II) are selected from the group consisting of Al, Zr, Hf, Ti, Ge, Sn, Cr, Nb, Ga, Fe, Sc, In, Y, La, Lu, Mg. However, the ceramic compound may have different conductivity depending on a material added thereto. In Chemical Formula 1, M(I) may be Al and M(II) may be Ti.

When the highly ion conductive ceramic compound represented by the above Chemical Formula 1 is attached to the surface of the core, it may suppress a side reaction that may occur between the core and the electrolyte of a lithium secondary battery.

Herein, the x and y may be in a range of $0<x\leq0.7$ and $0\leq y\leq1$ as aforementioned. When the x and y are within the range, the positive active material may have optimal electrochemical effects.

Conventionally, a core has been coated with an oxide, hydroxide, oxyhydroxide, oxycarbonate, or hydroxycarbonate of an element such as Al, Ti, Mg, Sn, or the like. However, the highly lithium ion conductive ceramic compounds according to one embodiment of the present invention may bring about stability of a lithium secondary battery at a high voltage when coated on the surface of a core, rather than the coating of the compound.

The highly lithium ion conductive ceramic compounds represented by the above Chemical Formula 1 may be attached to the core as a layer and/or as discrete particles. The discrete particle attachment indicates that ceramic compound particles discontinuously and randomly exist on the surface of the core.

When the highly ion conductive ceramic compounds is attached to the surface of the core as a layer, the layer may be 0.05 to 5 μm thick. When the coating layer is thicker than this range, less active material may be coated per unit volume of an electrode, deteriorating the energy density and electrochemical performance of a lithium ion battery. In addition, the active material may have decreased electronic conductivity, deteriorating battery performance. When the coating layer is thin, it may have little effect on suppressing side reactions between the core and the electrolyte.

When the highly lithium ion conductive ceramic compound is attached to the core as discrete particles, the highly lithium ion conductive ceramic particle may have a size ranging from 0.05 to 4 μm. When the highly lithium ion conductive ceramic compound has a size within the range, the highly lithium ion conductive compounds may surround the core with appropriate density, not limiting the effects of the present invention.

The aforementioned positive active material for a lithium secondary battery may include the core particle in an amount ranging from about 96 wt % to about 98.5 wt % and the highly lithium ion conductive ceramic particle ranging from about 1.5 wt % to about 4 wt %. In addition, the core particle may be included in an amount ranging from about 97 wt % to about 98 wt %, and the highly lithium ion conductive ceramic particle may be in an amount ranging from about 2 wt % to about 3 wt %. When the highly lithium ion conductive ceramic particle and the core are included within the range, a lithium secondary battery including the active material may have maximum discharge capacity.

This positive active material according to one embodiment of the present invention includes a highly ion conductive ceramic compound for coating and thus, may be prevented from directly contacting an electrolyte and inhibit a side reaction between the core and the electrolyte at high temperatures or high voltages. Accordingly, the positive active material may enhance the stability of a battery system without using an expensive additive.

Furthermore, a lithium secondary battery including a positive active material according to one embodiment of the present invention may have excellent high rate characteristics and high battery efficiency.

Hereinafter, illustrated is a method of manufacturing a positive active material for a rechargeable battery according to one embodiment of the present invention.

FIG. 1 provides a flowchart showing a method of manufacturing a positive active material for a rechargeable battery according to one embodiment of the present invention.

In order to prepare the highly lithium ion conductive ceramic particle, a method of manufacturing a positive active material for a rechargeable battery according to one embodiment of the present invention may include mixing a Li source, a M(I) source, a M(II) source, and a phosphate source (S101). In the mixing, a Si source may be further added.

As aforementioned, since the highly lithium ion conductive ceramic particle may include each element in various amounts, the sources may be included corresponding therewith.

The Li source may include, for example, $Li_2CO_3$, $LiNO_3$, $Li_3PO_4$, and the like. Examples of M(I) source may include, but is not limited into oxide, phosphate, nitrate, alkoxide of M(I), and the like. If M(I) is Al, examples of the Al source may include $Al_2O_3$, $AlPO_4$, $Al(NO_3)_3 \cdot 9H_2O$, and the like. Examples of M(I) source may include, but is not limited into oxide, phosphate, nitrate, alkoxide of M(II), and the like. If M(II) is Ti, example of the Ti source may include $TiO_2$, $TiP_2O_7$, titanium propoxide, titanium butoxide and the like. Examples of the phosphate source may include $(NH_4)_2HPO_4$, $NH_4H_2PO_4$, $Li_3PO_4$, and the like. Examples of the Si source may include, but is not limited into oxide, alkoxide, hydroxide of Si.

The mixing may be performed through ball-milling. The ball-milling may be performed using a ball, for example, a zirconia ball and the like. The ball may have a size ranging from about 0.3 to about 10 mm. The ball may vary unless it limits the effects of the present invention. The ball-milling may be performed for about 1 to about 48 hours. When the ball-milling is performed within the above time, the highly ion conductive ceramic compound may be prepared to have a desirable size for attachment to a core.

However, the mixing may be performed in various ways other than the ball-milling, if reactants may be uniformly mixed.

Next, the mixture may be heated in a first heating step (S102). The mixture prepared in the process S101 may be formed into the highly ion conductive ceramic compound through the first heating step S102.

The firstly heating step S102 may be performed by increasing a temperature at an increasing rate ranging from 0.1 to 10° C./min. When the increasing rate is within the range, a side reaction may be suppressed.

The heating may be performed up to a temperature ranging from 650° C. to 800° C. When the first heating step S102 is performed over 800° C., there may be a side reaction problem.

Then, the highly ion conductive ceramic compound may be naturally cooled down.

Next, the cooled highly ion conductive ceramic compound may be ground (S103).

Herein, the highly ion conductive ceramic compound may be uniformly ground into a size ranging from 0.05 μm to 4 μm. This pulverizing may include any method if the highly ion conductive ceramic compound is pulverized into particles with a uniform size. For example, the pulverizing may include a paint shaker, a homogenizer, a PD mixer, a ball-miller, and the like.

The ball milling may be performed using a ball, for example, a zirconia ball and the like. The ball may have a size ranging from about 0.3 mm to about 5 mm. The size or shape of the ball has no particular limit unless it limits effects of the present invention. The ball milling may be performed for about 1 hour to about 48 hours. When the ball milling is performed within the time, the highly ion conductive ceramic compound particles may be uniformly distributed.

Then, the resultant may be heated in a second heating step (S104).

The second heating step S104 may be performed by increasing a temperature at an increasing rate ranging from about 0.5° C./min to about 10° C./min. When the heating is performed within the range, a reaction may be suppressed. The positive active material may have uniform crystallinity since it has no temperature gradient overall.

The second heating step may be performed at a higher temperature than the first heating step S102 and may be higher than or equal to about 800° C. and in particular, higher than or equal to about 950° C. When the second heating step is lower than the temperature, highly ion conductive ceramic particles may have low structural crystallinity, deteriorating ion conductivity and having bad influence on battery performance.

The second heating step (S104) may transform a highly ion conductive ceramic compound from a mixture of different crystalline phases to one-phase crystalline structure.

Next, the prepared highly ion conductive ceramic compound may be cooled down to about 300° C. at a descending rate ranging from about 1° C./min to 5° C./min and then, naturally cooled down. When the highly ion conductive ceramic compound is cooled down faster than the range, it may have inside and surface structure transformation, leading to insufficient performance of an active material.

The second heating step (S104) can provide crystalline highly ion conductive ceramic compound. The crystalline highly ion conductive ceramic compound may be ground again (S105).

The pulverizing (S105) may be performed under hygroscopic condition. Herein, the highly ion conductive ceramic compound may be ground to be finer. The pulverizing may have no particular limit if it may provide uniform pulverizing and mixing and for example, include ball milling, a paint shaker, or a homogenizer.

For example, the pulverizing (S105) may be performed by ball-milling. The ball milling may be performed under a solvent. The solvent may include ethanol, hexane, heptane, isopropanol, N-methyl pyrrolidone, and the like.

The ball milling may be performed using a ball, for example, a zirconia ball, and the like. The ball may have a size ranging from about 0.3 mm to about 10 mm. The ball has no limit in its size or shape. The ball milling may be performed for about 8 hours to about 48 hours. When the ball milling is performed within the time range, it may uniformly distribute highly ion conductive ceramic compound particles.

When pulverizing under a solvent, the highly ion conductive ceramic compound is precipitated (S106). The precipitation may be performed for about 6 hours to about 8 hours (S106). This time range may be sufficient for the precipitation.

Then, the precipitated highly ion conductive ceramic compound is collected from the top, and a core including a compound that may reversibly intercalate and deintercalate lithium may be added thereto (S107).

The added core may include at least one composite oxide including a metal selected from cobalt, manganese, nickel, and a combination thereof, and lithium.

Next, the mixture is mixed to attach the highly ion conductive ceramic compound to the surface of the core particle (S108).

The mixing may include any method if it brings about uniform mixture but does not change particle diameter.

For example, it may be performed by ball milling. The ball milling is performed using a ball, for example, a zirconia ball and the like. The ball has a size ranging from about 0.3 mm to 10 mm.

The ball has no limit in its size and shape unless it limits effects of the present invention. When the ball has a size only within the range, highly ion conductive ceramic compound may be attached to a core as discrete particles and/or a layer. The ball milling may be performed for about 1 hour to about 48 hours. When the ball milling is performed within the time range, ATP may be sufficiently attached to a core particle.

In this way, a positive active material for a lithium secondary battery is prepared, the positive active material including a core that includes a compound that may reversibly intercalate and deintercalate lithium with highly ion conductive ceramic compound attached to the surface thereof, according to one embodiment of the present invention.

When the mixing (S108) is performed in a ball milling method, highly ion conductive ceramic compound particles may be uniformly attached to the surface of core particles. In addition, methods according to embodiments of the invention have low costs.

Then, a third heating step (S109) may be performed to complete the reaction.

The third heating step (S109) may be performed by increasing the temperature at an increasing rate ranging from about 0.5° C./min to about 10° C./min. When the heating is performed within the increasing rate, the reaction may be controlled.

The heating may be performed until the temperature reaches a temperature ranging from about 650° C. to about 950° C. When the heating is performed within this range, it may stabilize core particles attached with highly ion conductive ceramic compound particles to the surface.

Then, the core attached with highly ion conductive ceramic compound to the surface is cooled down to about 300° C. at a descending rate ranging from about 1° C./min to about 2° C./min and naturally cooled down.

According to another embodiment of the present invention, a positive electrode for a lithium secondary battery is provided by mixing the aforementioned positive active material, a conductive material, and a binder in a solvent to prepare an active material composition, and coating the active material composition on a current collector. The solvent may include N-methylpyrrolidone and the like but is not limited thereto.

A negative electrode, an electrolyte, and a separator for fabricating a battery are well-known in a related art and will not be illustrated in detail here.

According to another embodiment of the present invention, a lithium secondary battery is fabricated by using the positive electrode, a negative electrode, an electrolyte, and a separator.

The following examples illustrate embodiments of the present invention in more detail. However, it is understood that the present invention is not limited by these examples.

EXAMPLES AND COMPARATIVE EXAMPLES

1. Preparation of ATP $Li_{1.3}Al_{0.3}Ti_{1.7}(PO_4)_3$ (ATP) was prepared in the following method.

In order to synthesize 10 g of ATP, 1.25 g of $Li_2CO_3$ having 99% of purity and having 40 mesh (Sigma-Aldrich Co), 3.54 g of $TiO_2$ having 99% of purity and 325 μm, 0.399 g of $Al_2O_3$ having 150 mesh and in an activated neutral standard level (Sigma-Aldrich Co.), and 10.33 g of $(NH_4)_2HPO_4$ in the first grade (Shinyo Pure Chemical Co., Ltd.) were ball-milled for 2 to 12 hours with a 5 mm zirconia ball.

Then, the mixture was heated by increasing a temperature at an increasing rate of 1° C./min from a room temperature to 700° C., maintained at 700° C. for 2 hours, and then, naturally cooled down.

The cooled product was ball-milled using a 5 mm zirconia ball for 12 to 24 hours.

The ball milled product was heated by increasing a temperature at an increasing rate 1° C./min to 920° C. and maintained at 920° C. for 8 hours and then, cooled down at a descending rate of 1° C./min down to 300° C. and naturally cooled down.

The resulting $Li_{1.3}Al_{0.3}Ti_{1.7}(PO_4)_3$ by twice-heating was ball-milled in ethanol for 48 to 72 hours using a 5 mm zirconia ball.

2. Preparation of $LiCoO_2$ (LCO) Coated with ATP

The ball-milled ATP was precipitated in ethanol for 7 hours. Then, $LiCoO_2$ was added to the precipitated ATP. The ATP and the $LiCoO_2$ were ball-milled in ethanol for 1 to 10 hours using a 5 mm zirconia ball.

The ball-milled product was heated by increasing the temperature at an increasing rate of 1° C./min up to 700° C. and maintained at 700° C. for 2.5 hours and then, cooled down at a rate of 1° C./min down to 300° C. and naturally cooled down, preparing $LiCoO_2$ coated with ATP on the surface.

3. Fabrication of Electrode

Fabrication of Positive Electrode

Example 1

$LiCoO_2$ including ATP particles attached to the surface was used as a positive active material. The ATP particle was attached to $LiCoO_2$ as a thin layer and as discrete particles. The positive active material had a size of 20 μm and included 1 wt % of ATP based on its total weight.

94 wt % of the $LiCoO_2$ positive active material coated with ATP, 3 wt % of carbon black as a conductive agent, and 3 wt % of polyvinylidene fluoride as a binder were added to N-methyl 2 pyrrolidone (NMP) as a solvent, preparing positive active material slurry. The positive active material slurry was coated on a 15 μm-thick aluminum (Al) thin film as a positive current collector and then, dried and roll-pressed, fabricating a positive electrode.

Example 2

$LiCoO_2$ including ATP particles attached to the surface was used as a positive active material. The ATP particle was attached to $LiCoO_2$ as a thin layer and as discrete particles. The positive active material had a size of 20 μm and included 2 wt % of ATP based on its entire weight.

94 wt % of the $LiCoO_2$ positive active material coated with ATP, 3 wt % of carbon black as a conductive agent, and 3 wt % of polyvinylidene fluoride as a binder were added to N-methyl 2 pyrrolidone (NMP) as a solvent, preparing positive electrode slurry. The positive electrode slurry was coated on a 15 μm-thick aluminum (Al) thin film as a current collector and then, dried and roll-pressed, fabricating a positive electrode.

Example 3

$LiCoO_2$ coated with ATP particles on the surface was used as a positive active material. The ATP particle was attached to $LiCoO_2$ as a thin layer and as discrete particles. The positive active material had a size of 20 μm and included 3 wt % of ATP based on its entire weight.

94 wt % of the ATP-coated $LiCoO_2$ positive active material, 3 wt % of carbon black as a conductive agent, and 3 wt % of polyvinylidene fluoride as a binder were added to N-methyl 2 pyrrolidone (NMP) as a solvent, preparing positive active material slurry. The positive active material slurry was a 15 μm-thick aluminum (Al) thin film as a current collector and then, dried and roll-pressed, fabricating a positive electrode.

Example 4

$LiCoO_2$ coated with ATP particles was used as a positive active material. The ATP particle was attached to $LiCoO_2$ as a thin layer and as discrete particles. The positive active material had a size of 20 μm and included 5 wt % of ATP based on the entire weight.

94 wt % of the ATP-coated $LiCoO_2$ positive active material, 3 wt % of carbon black as a conductive agent, and 3 wt % of polyvinylidene fluoride as a binder were added to N-methyl 2 pyrrolidone (NMP) as a solvent, preparing positive electrode slurry. The positive electrode slurry was coated on a 15 μm-thick aluminum (Al) thin film current collector and then, dried and roll-pressed, fabricating a positive electrode.

Example 5

$LiCoO_2$ coated with ATP particles was used as a positive active material. The ATP particle was attached to $LiCoO_2$ as a thin layer and as discrete particles. The positive active material had a size of 20 μm and included 9 wt % of ATP based on the entire weight.

94 wt % of the ATP-coated LCO positive active material, 3 wt % of carbon black as a conductive agent, and 3 wt % of polyvinylidene fluoride as a binder were added to N-methyl 2 pyrrolidone (NMP) as a solvent, preparing positive active material slurry. The positive active material slurry was coated on a 15 μm-thick aluminum (Al) thin film as a current collector and then, dried and roll-pressed, fabricating a positive electrode.

Comparative Example 1

$LiCoO_2$ coated with no ATP particles was used as a positive active material. The positive active material had a size of 20 μm.

94 wt % of the $LiCoO_2$ positive active material, 3 wt % of carbon black as a conductive agent, and 3 wt % of polyvinylidene fluoride as a binder were added to N-methyl 2 pyrrolidone (NMP) as a solvent, preparing positive active material slurry. The positive active material slurry was coated on a 15 μm-thick aluminum (Al) thin film as a current collector and then, dried and roll-pressed, fabricating a positive electrode.

Example 6

$LiCoO_2$ coated with ATP particles on the surface was used as a positive active material. The ATP particle was attached to $LiCoO_2$ as a thin layer and as discrete particles. The positive active material had a size of 10 μm and included 2 wt % of ATP based on the entire weight.

94 wt % of the ATP-coated $LiCoO_2$ positive active material, 3 wt % of carbon black as a conductive agent, and 3 wt % of polyvinylidene fluoride as a binder were added to N-methyl 2 pyrrolidone (NMP) as a solvent, preparing positive active material slurry. The positive active material slurry was coated on a 15 μm-thick aluminum (Al) thin film as a current collector and then, dried and roll-press, preparing a positive electrode.

Example 7

$LiCoO_2$ coated with ATP particles on the surface was used as a positive active material. The ATP particle was attached to $LiCoO_2$ as a thin layer and as discrete particles. The positive active material had a size of 10 μm and included 3 wt % of ATP based on the entire weight.

94 wt % of the ATP-coated $LiCoO_2$ positive active material, 3 wt % of carbon black as a conductive agent, and 3 wt % of polyvinylidene fluoride as a binder were added to N-methyl 2 pyrrolidone (NMP) as a solvent, preparing positive active material slurry. The positive active material slurry was coated on a 15 μm-thick aluminum (Al) thin film as a current collector and then, dried and roll-pressed, fabricating a positive electrode.

Example 8

$LiCoO_2$ coated with ATP particles on the surface was used as a positive active material. The ATP particle was attached to $LiCoO_2$ as a thin layer and as discrete particles. The positive active material had a size of 10 μm and included 5 wt % of ATP based on the entire weight.

94 wt % of the ATP-coated $LiCoO_2$ positive active material, 3 wt % of carbon black as a conductive agent, and 3 wt % of polyvinylidene fluoride as a binder were added to N-methyl 2 pyrrolidone (NMP) as a solvent, preparing positive electrode slurry. The positive electrode slurry was coated on a 15 μm-thick aluminum (Al) thin film as a current collector and then, dried and roll-pressed, preparing a positive electrode.

Comparative Example 2

$LiCoO_2$ coated with no ATP particles on the surface was used as a positive active material. The positive active material had a size of 10 μm.

94 wt % of the LCO positive active material, 3 wt % of carbon black as a conductive agent, and 3 wt % of polyvinylidene fluoride as a binder were added to N-methyl 2 pyrrolidone (NMP) preparing positive active material slurry. The positive active material slurry was coated on a 15 μm-thick aluminum (Al) thin film as a current collector and then, dried and roll-pressed, fabricating a positive electrode.

Each prepared positive electrode was used with a Li metal as a counter electrode and an electrolyte prepared by mixing ethylene carbonate, ethylmethyl carbonate, and diethyl carbonate in a volume ratio of 3:6:1 and including 1.15M of $LiPF_6$ in the mixture to fabricate a half-cell type.

EXPERIMENTAL EXAMPLES

Discharge Capacity Experiment Depending on ATP Amounts

The battery cells according to Examples 1 to 8 and Comparative Examples 1 and 2 were measured regarding discharge capacity. The results are provided in FIGS. 2A and 2B.

Figure 2A:
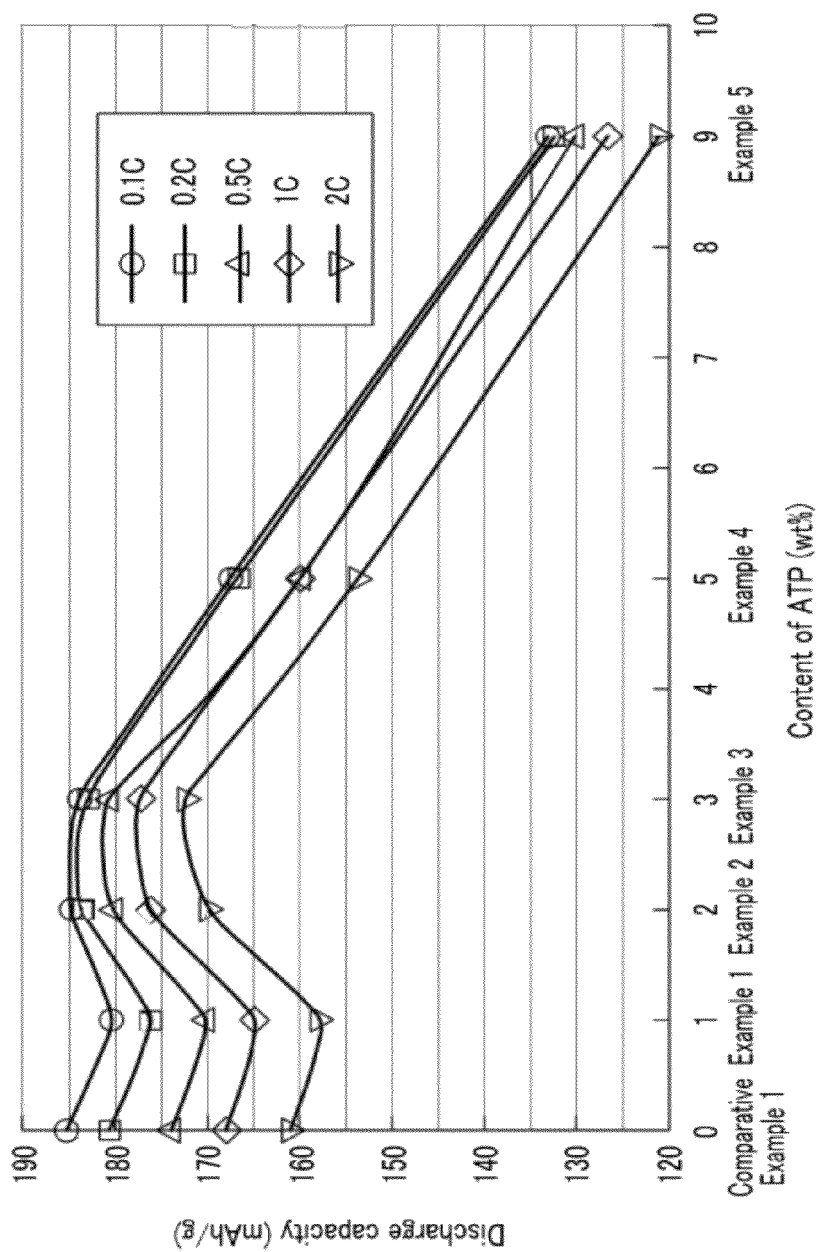
FIGS. 2A and 2B show discharge capacity experimental data depending on $Li_{1+x}M(I)_xM(II)_{2-x}Si_yP_{3-y}O_{12}$ content.

Referring to FIG. 2A, the battery cells were discharged at C-rates ranging from 0.1 C to 2 C, all similar tendencies exhibited. However, the battery cell according to Example 3 exhibited small capacity drop at high rates, but that according to Comparative Example 1 exhibited large capacity drop at high rates.

Figure 2B:
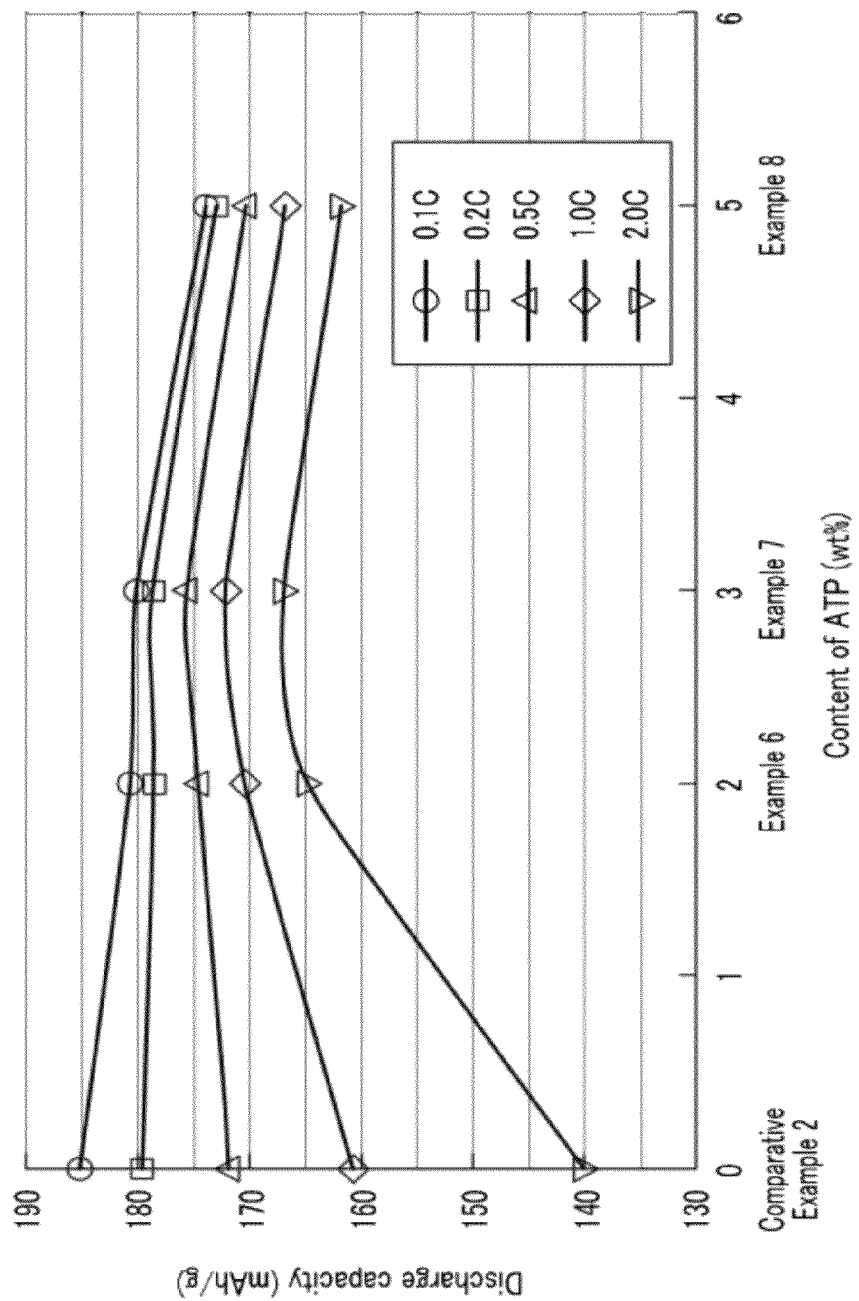

Referring to FIG. 2B, the battery cells had a bigger discharge capacity difference at a higher rate. The batteries of Comparative Example 2 and Example 7 had the biggest discharge capacity difference at 2 C.

In addition, the battery cells including a positive active material with a smaller particle size and including more ATP had smaller discharge capacity difference.

Referring to FIGS. 2A and 2B, $LiCoO_2$ coated with ATP in an amount ranging from 1.5 to 3.5 wt % turned out to accomplish excellent battery discharge capacity.

2. Cyclic Voltammogram

The battery cells according to Comparative Example 1 and Example 2 were used at a scanning rate of 0.02 mV/sec at a temperature of 25° C.

Figure 3A:
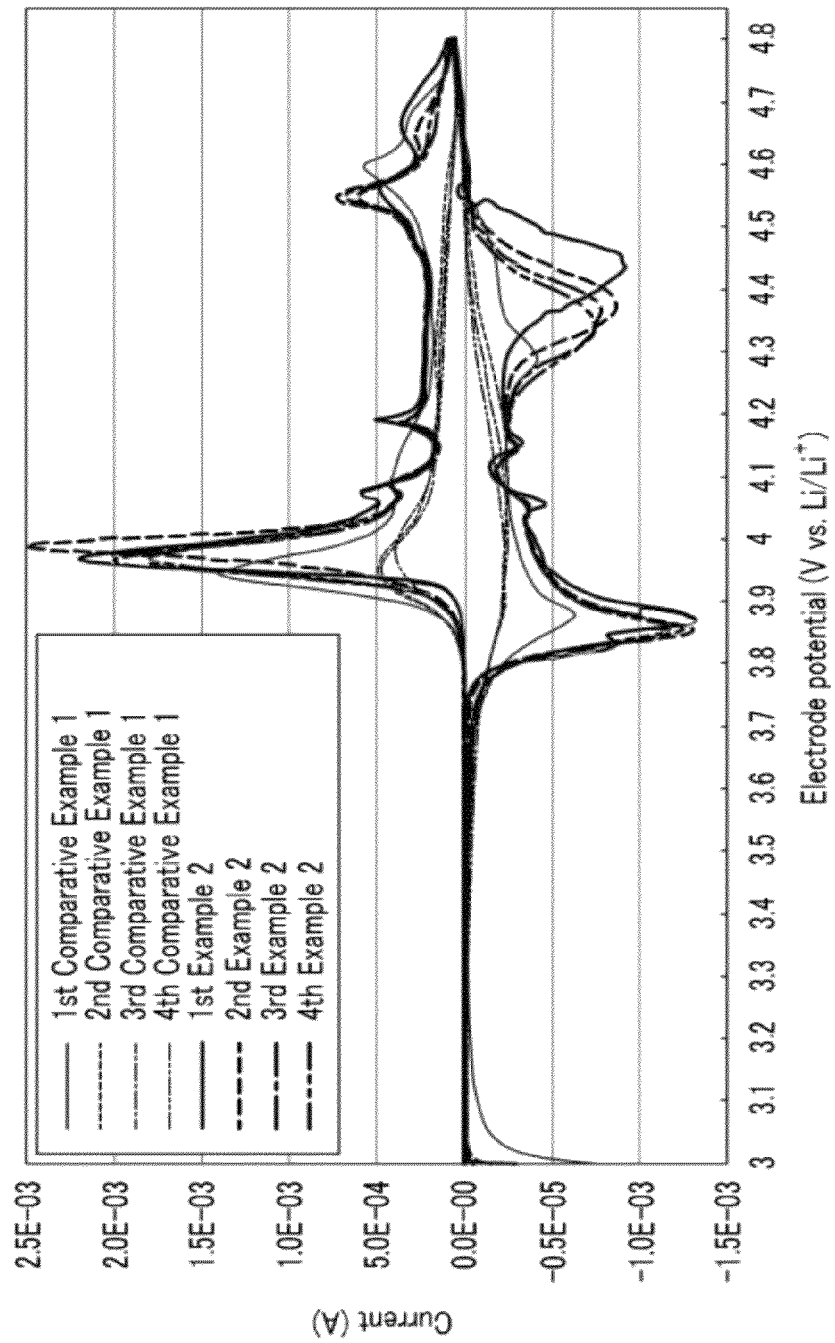
FIGS. 3A and 3B show cyclic voltammogram data.
Figure 3B:
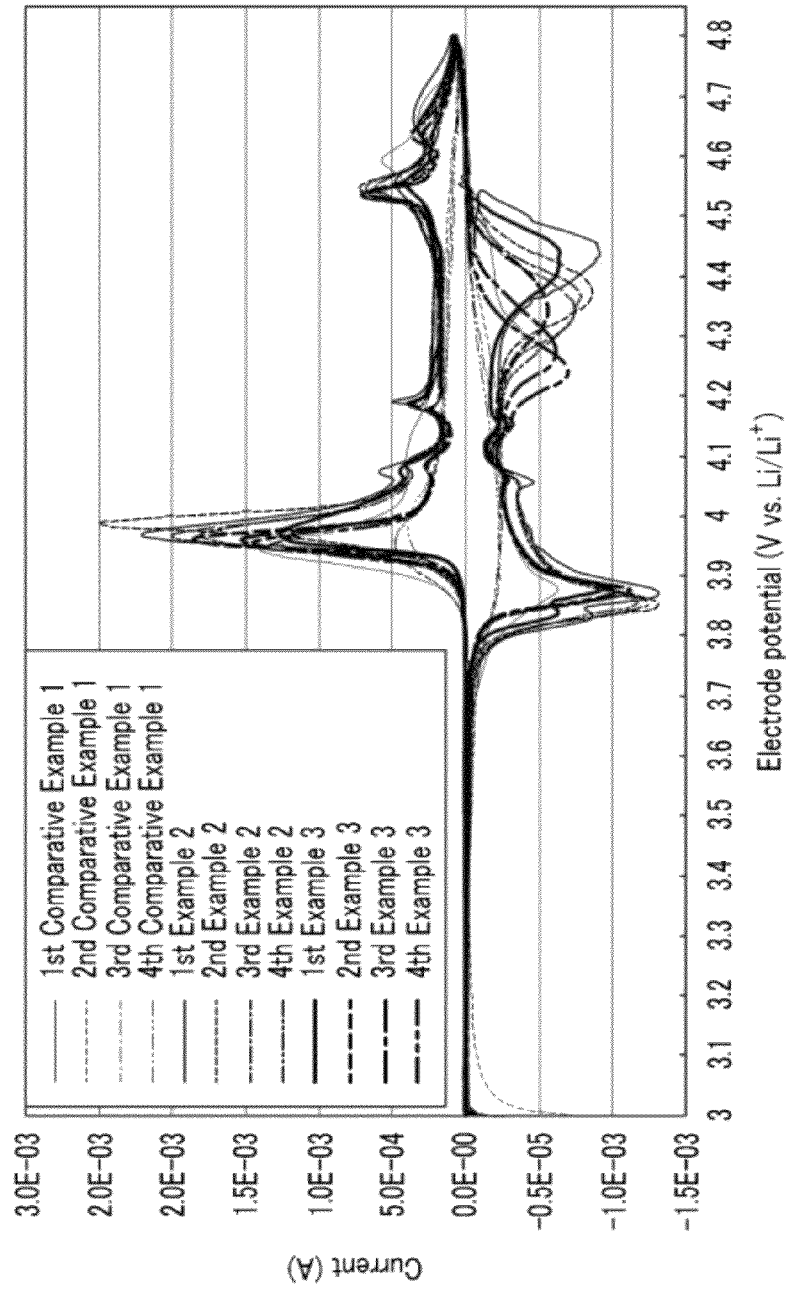

The results are provided in FIGS. 3A and 3B. As shown in FIGS. 3A and 3B, the battery cells of Examples 2 and 3 had a big current at a higher voltage (right at the X axis in the graph) and thus, excellent stability at a high voltage.

3. CV Efficiency at First Cycle of CV

The batteries according to Examples 2 and 5 and Comparative Example 1 were measured regarding coulombic efficiency during CV cycling. The measurement was performed at 25° C. under a condition of 0.02 mV/sec at 4.5V, 4.6V, and 4.8V, respectively. The results are provided in FIG. 4.

Referring to FIG. 4, the battery cell of Comparative Example 1 had sharply decreased charge-discharge efficiency at a high voltage of 4.8V. To the contrary, the battery cells including ATP according to Examples 2 and 5 maintained charge-discharge efficiency at a high voltage. Furthermore, the battery cell of Example 2 exhibited better charge-discharge efficiency than that of Example 5.

4. Capacity Retention and Cycling Efficiency Depending on CV Cycles

The battery cells according to Examples 2 and 7 and Comparative Example 1 were measured regarding capacity retention depending on cycles. The measurement was performed at 25° C. under a condition of 0.02 mV/sec. The result is provided in FIG. 5A.

Figure 5A:
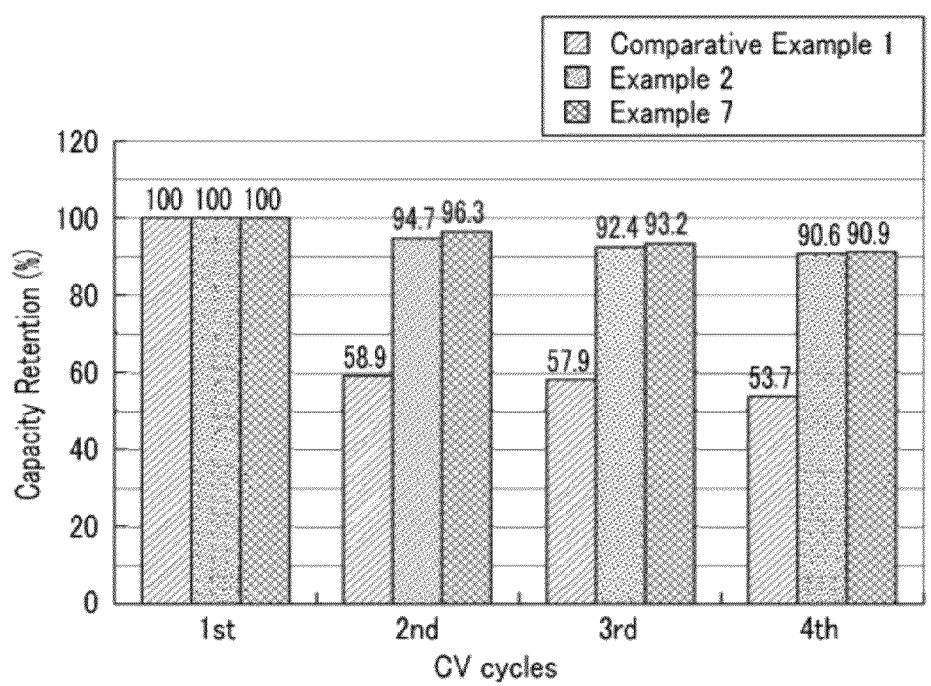
FIGS. 5A and 5B show capacity retention and cyclic efficiency data depending on CV cycles.

As shown in FIG. 5A, the battery cell of Comparative Example 1 battery had sharply decreased capacity retention by 50% from the second cycle. The battery cells of Examples 2 and 7 maintained capacity retention of more than 90% regardless of CV times.

The battery cells were measured regarding cycling efficiency under the same condition. The results are provided in FIG. 5B.

Figure 5B:
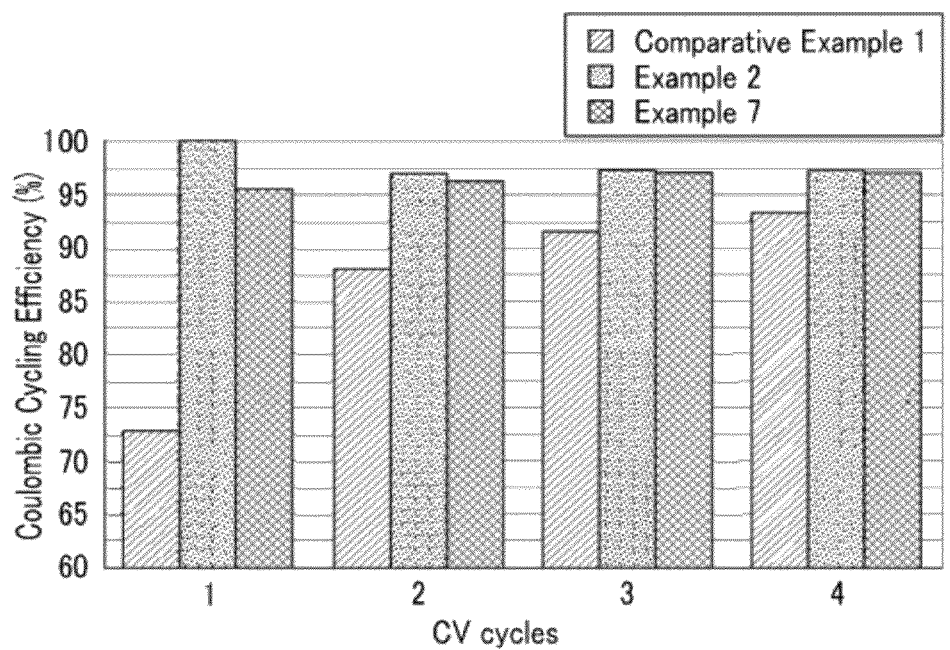

As shown in FIG. 5B, the battery cell of Comparative Example 1 had sharply decreased efficiency at the $1^{st}$ cycle and better efficiency at repeated cycles, which was lower than the efficiency at the $1^{st}$ cycle of the battery cells according to Examples 2 and 7.

5. Rate Performance Depending on Temperature and Charge Cut-Off Voltage

The batteries according to Comparative Example 1 and Example 2 were selectively experimented. The experiment was performed changing a temperature of 25° C. and 60° C. and a charge cut-off voltage of 4.3V and 4.5V. The results are provided in FIG. 6.

Figure 6:
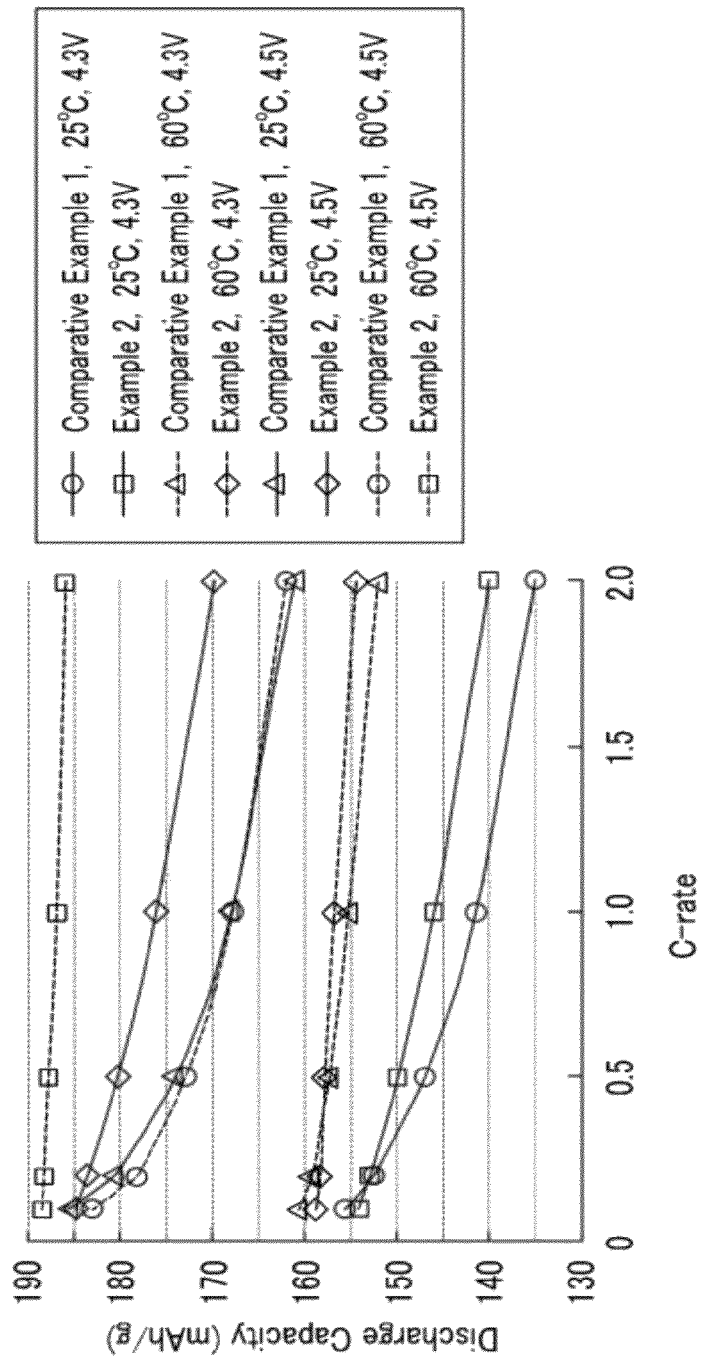
FIG. 6 shows temperature- and voltage-rate performance data.

As shown in FIG. 6, the battery cell of Example 2 had high capacity under the same temperature and charge cut-off voltage at high C-rate.

In addition, the battery cells had the biggest capacity difference at 60° C. and 4.5V. The reason is that the battery cell including an electrode having ATP and the one including an electrode having no ATP had a bigger capacity difference at higher temperature and higher charge cut-off voltage.

6. Capacity Comparison Depending on Charge Cut-Off Voltage

Two battery cells according to Example 2 and Comparative Example 1 were selected and experimented. They were compared regarding capacity depending on charge cut-off voltage and separately experimented at 0.5 C and 1 C. The results are provided in FIG. 7.

Figure 7:
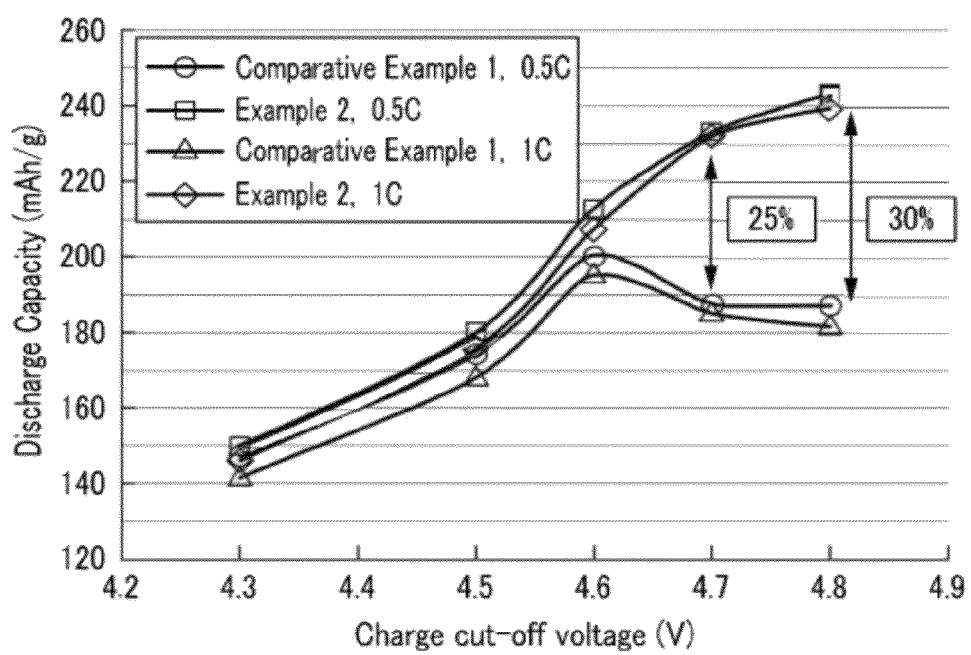
FIG. 7 is capacity comparison data depending on charge cut-off voltage.

As shown in FIG. 7, the battery cells according to Example 2 and Comparative Example 1 had a bigger capacity difference at a higher charge cut-off voltage. In other words, the ATP is said to secure stability constantly, maintaining the capacity of a rechargeable battery at a high charge cut-off voltage.

On the contrary, the battery cell of Comparative Example 1 had a decrease in capacity at 4.7V and 4.8V, which shows that a battery cannot work.

7. Discharge Capacity Comparison at High Charge Cut-Off Voltage Depending on Cycle Numbers Two battery cells according to Comparative Example 1 and Example 2 were selected and experimented. The battery cells were experimented at a high charge cut-off voltage of 4.5V or more and respectively twice experimented. The discharge capacity results at a high charge cut-off voltage depending on cyclings are provided in FIGS. 8A and 8B.

Referring to FIG. 8A, the battery cells according to Example 2 and Comparative Example 1 had a bigger discharge capacity difference at more cycles and a much bigger discharge capacity difference at a high rate of 1 C.

Figure 8B:
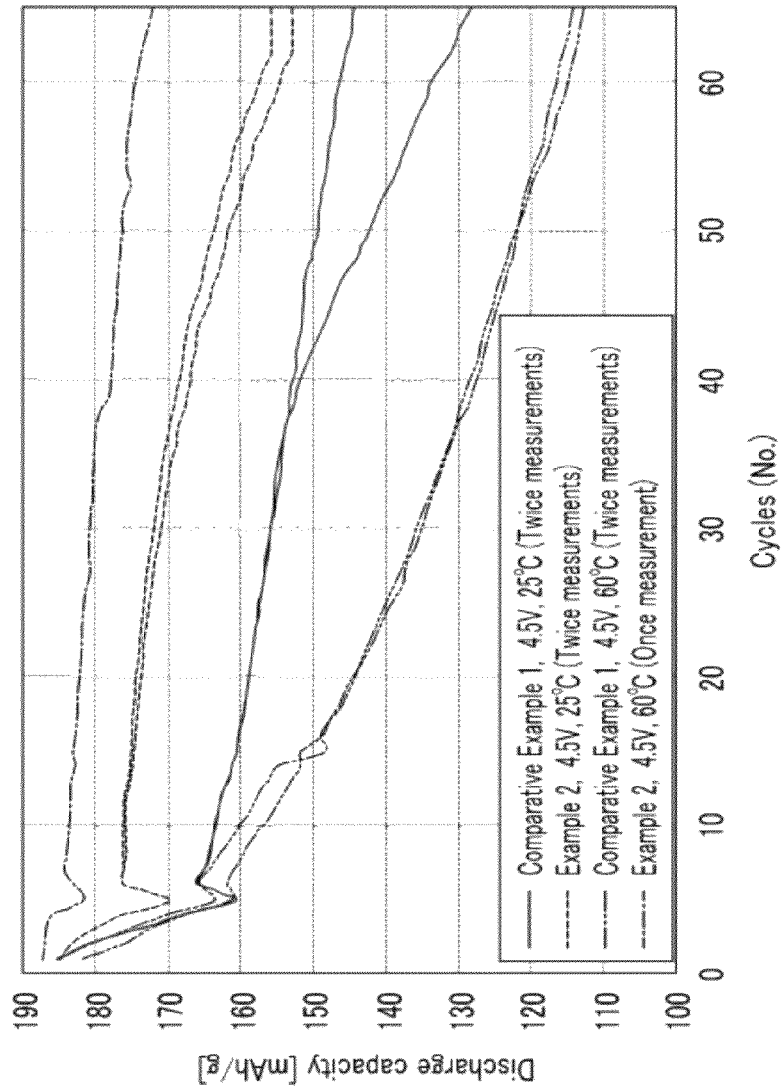

Referring to FIG. 8B, the battery cells according to Example 2 and Comparative Example 1 had a bigger discharge capacity difference at more cycles and a much bigger discharge capacity difference at a high temperature 60° C.

Figure 9:
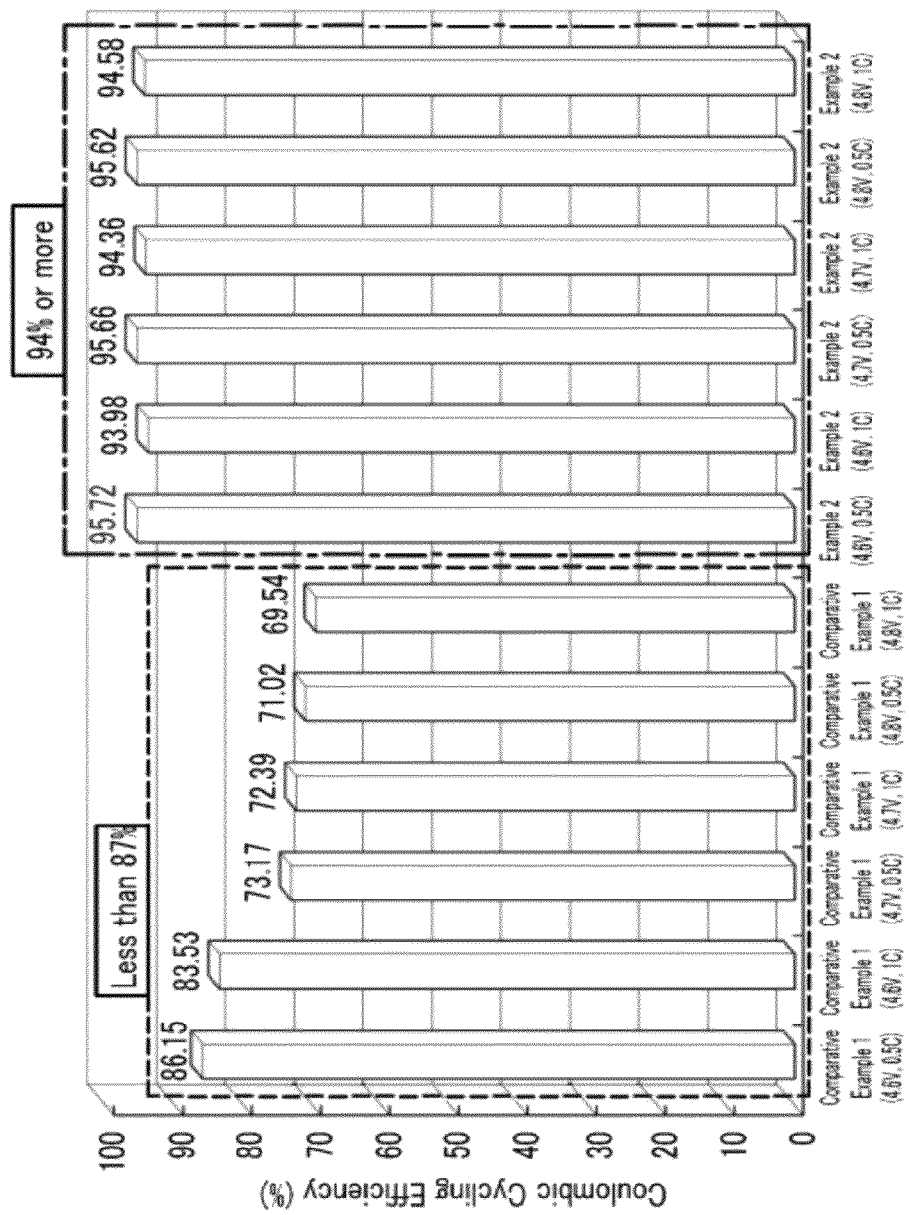
FIG. 9 shows $1^{st}$ cycle efficiency comparison data at a high charge cut-off voltage depending on various potentials and C-rates.

8. First Cycling Efficiency Comparison at High Charge Cut-Off Voltage Depending on Various Potentials and C Rates Two battery cells according to Comparative Example 1 and Example 2 were selected and experimented. The first cycling efficiency experiment was performed at a high charge cut-off voltage of 4.5V or more at a rate of 0.5 C and 1 C. The results are provided in FIG. 9.

The battery cell of Example 2 in general had efficiency of more than 94%, while the one of Comparative Example 1 had efficiency of less than 87%.

9. SEM Photograph of Electrode Surface of Battery Cell Coated with No ATP of Comparative Example 1 at High Charge Cut-Off Voltage The surface of an electrode coated with a positive active material no ATP included in a battery cell according to Comparative Example 1 was examined depending on charge cut-off voltage. The results are provided in FIGS. 10A, 10B, and 10C. FIG. 10A shows a result under the conditions of 4.6V and 1 C. FIG. 10B shows a result under the conditions of 4.7V and 1 C. FIG. 10C shows a result under the conditions of 4.8V and 1 C.

As shown in FIGS. 10A, 10B, and 10C, lots of side reactions were examined on the surface of an electrode at a high charge cut-off voltage of more than 4.6V. The side reaction tended to be severe at a higher charge cut-off voltage (at 4.7V and 4.8V).

10. SEM Photograph of Electrode Surface of a Battery Cell Coated with ATP of Example 2 at a High Voltage The surface of an electrode included in the battery cell according to Example 2 was examined depending on voltage. The results are provided in FIGS. 11A, 11B, and 11C. FIG. 11A provides a result under the conditions of 4.6V and 1 C. FIG. 11B provides a result under the conditions of 4.7V and 1 C. FIG. 11C provides a result under the conditions of 4.8V and 1 C.

As shown in FIGS. 11A, 11B, and 11C, there was no side reaction on the surface of an electrode at a high voltage of 4.8V.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for lithium secondary battery comprising:
   a core comprising a compound capable of reversibly intercalating and deintercalating lithium ions; and
   a compound attached to a surface of the core and represented by Chemical Formula 1:

$Li_{1.3}Al_{0.3}Ti_{1.7}(PO4)_3$ wherein the core comprises an amount of about 97.5 wt % to about 98.5 wt % of the positive active material, and the compound represented by Chemical Formula 1 comprises an amount of about 1.5 wt % to about 2.5 wt % of the positive active material.

2. The positive active material of claim 1, wherein the compound represented by Chemical Formula 1 is attached to the core as a layer.

3. The positive active material of claim 1, wherein the core comprises at least one composite oxide of lithium and a metal selected from the group consisting of cobalt, manganese, nickel, and a combination thereof.

4. A positive electrode comprising:
   the positive active material of claim 1, a conductive material, and a binder.

5. A lithium secondary battery comprising the positive electrode of claim 4.

6. The lithium secondary battery of claim 5, wherein the lithium secondary battery is configured to operate at a charge cut-off voltage of 4.35V or higher.

7. The positive active material of claim 1, wherein the compound represented by Chemical Formula 1 is attached to the core as discrete particles.

* * * * *